Sept. 22, 1964 J. R. LITTLE 3,150,280
INSULATED STACK OF ELECTRICAL LAMINATIONS
AND METHOD OF MAKING THE SAME
Filed Oct. 13, 1960 11 Sheets-Sheet 3

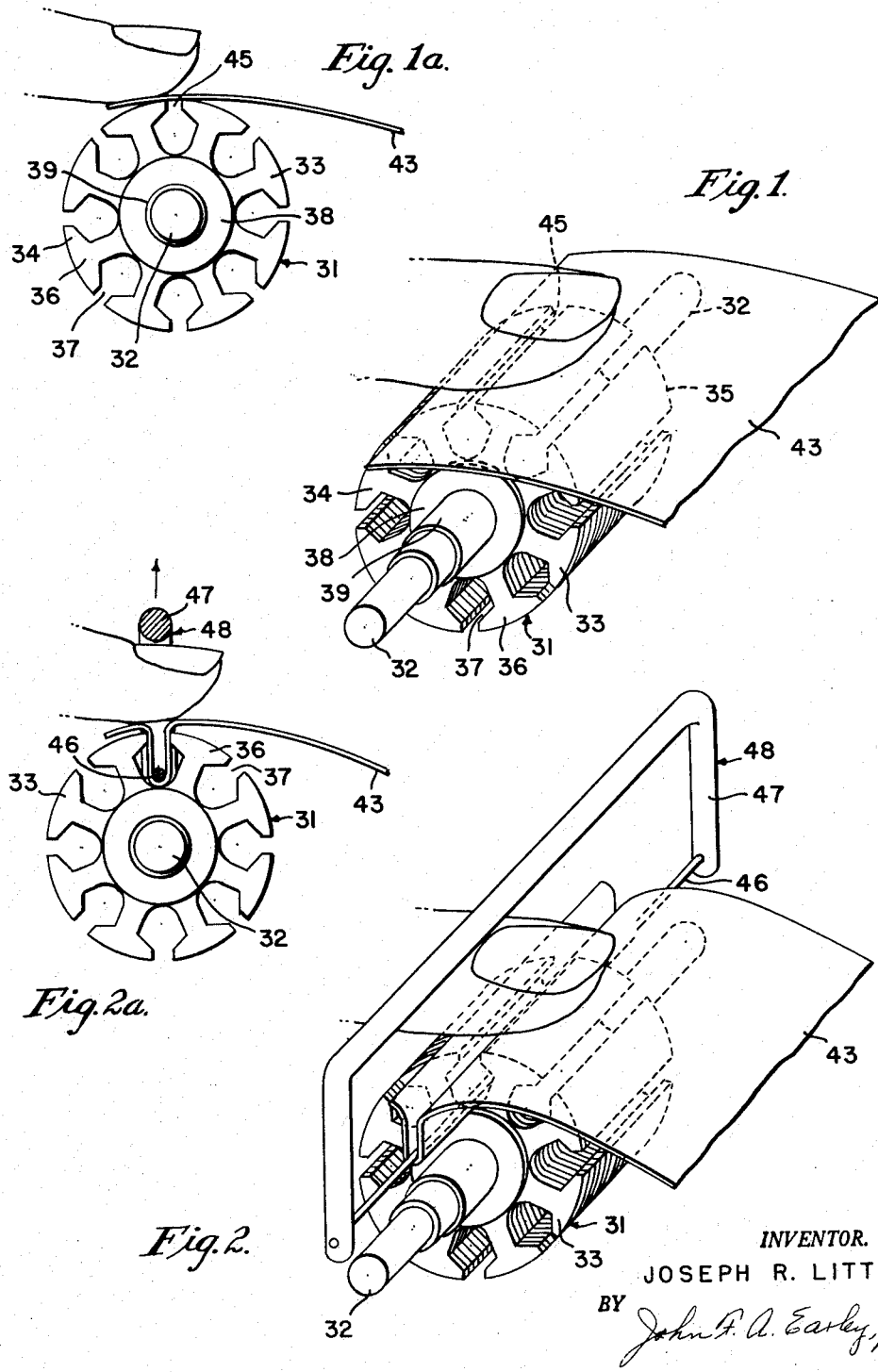

INVENTOR.
JOSEPH R. LITTLE
BY
ATTORNEY.

Sept. 22, 1964                J. R. LITTLE                3,150,280
          INSULATED STACK OF ELECTRICAL LAMINATIONS
                 AND METHOD OF MAKING THE SAME
Filed Oct. 13, 1960                          11 Sheets-Sheet 4
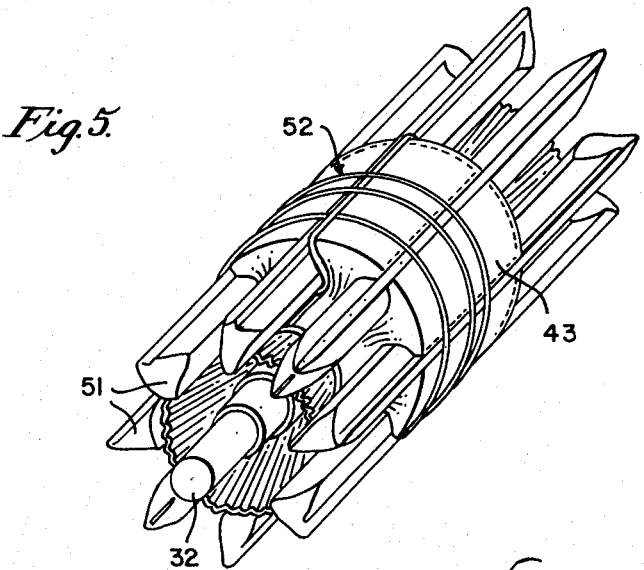
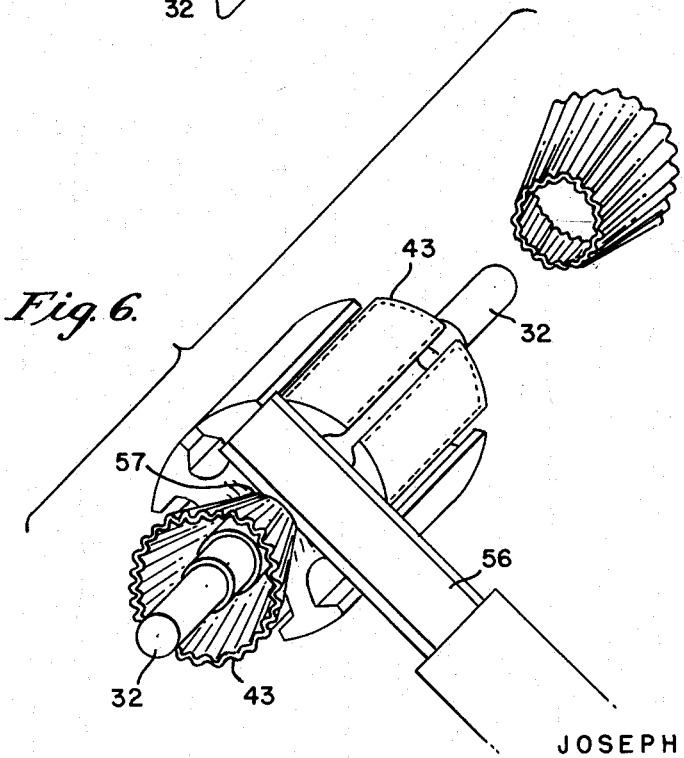
INVENTOR.
JOSEPH R. LITTLE
BY
ATTORNEY.

Sept. 22, 1964        J. R. LITTLE        3,150,280
INSULATED STACK OF ELECTRICAL LAMINATIONS
AND METHOD OF MAKING THE SAME
Filed Oct. 13, 1960        11 Sheets-Sheet 5
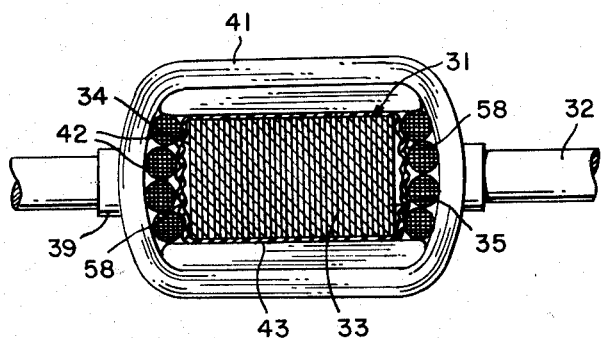
Fig. 7a.
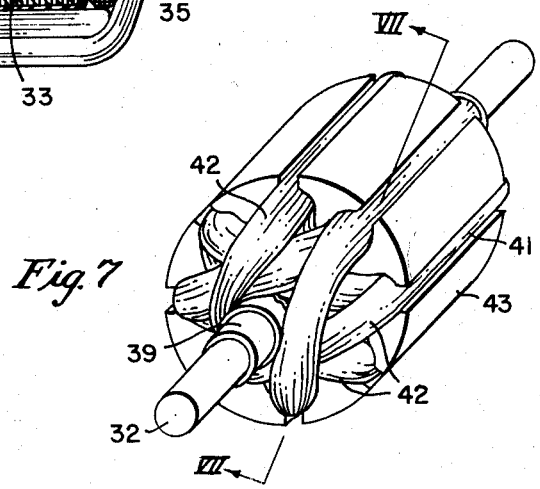
Fig. 7
Fig. 8b.
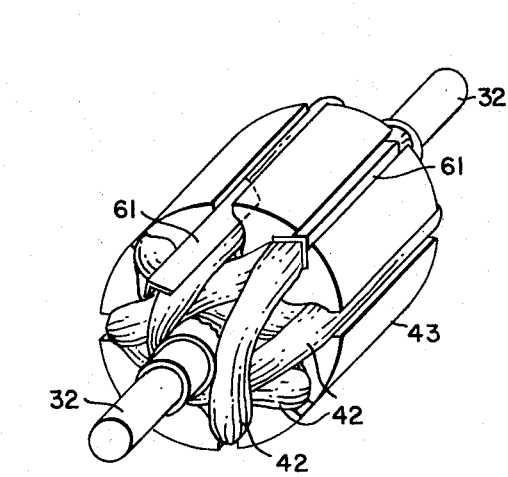
Fig. 8a.
Fig. 8.
INVENTOR.
JOSEPH R. LITTLE
BY
*John F. A. Earley, Jr.*
ATTORNEY.

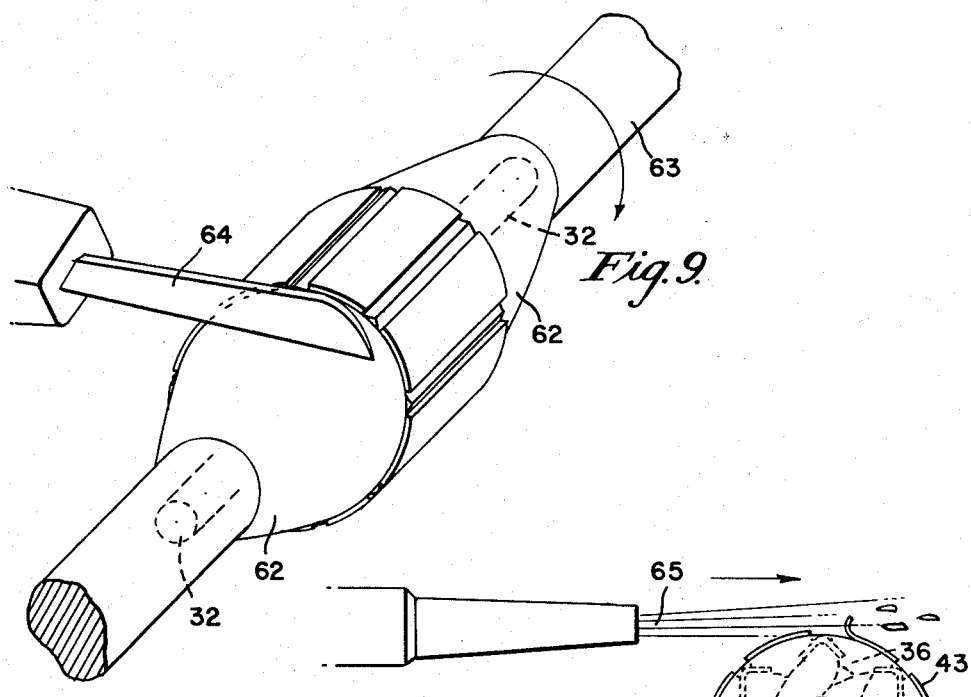
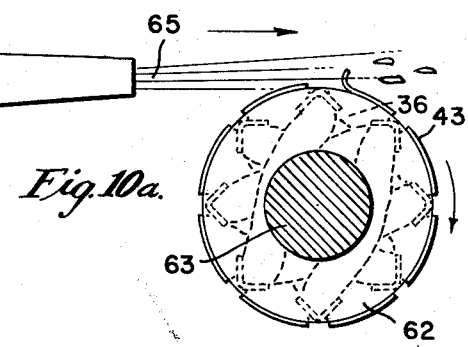
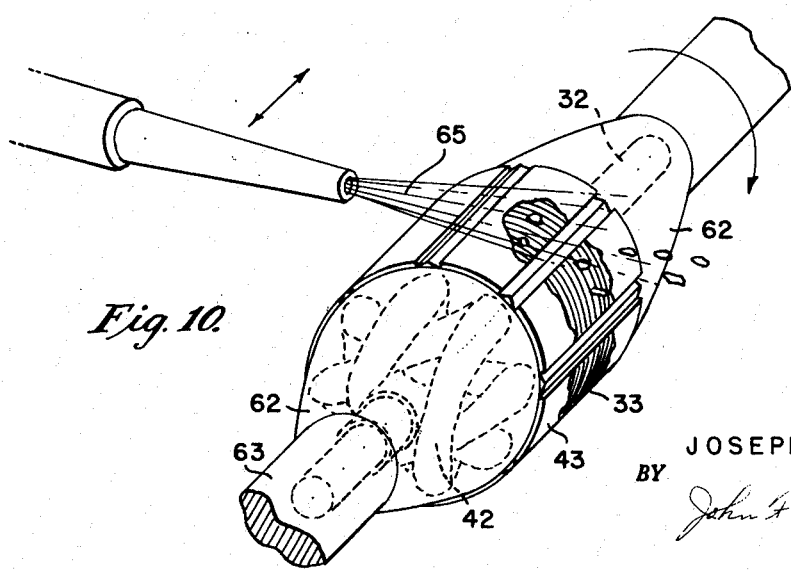

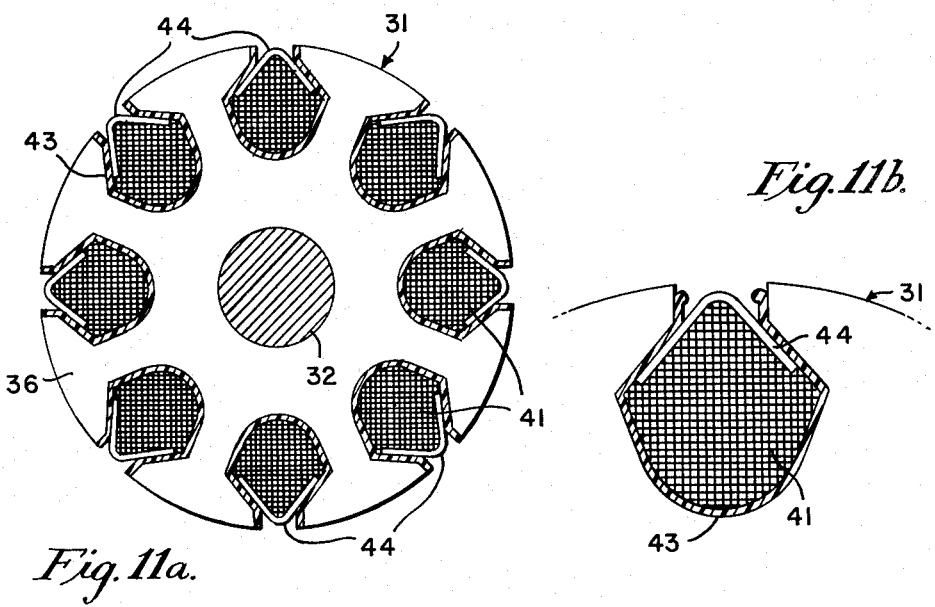
Fig. 11b.
Fig. 11a.
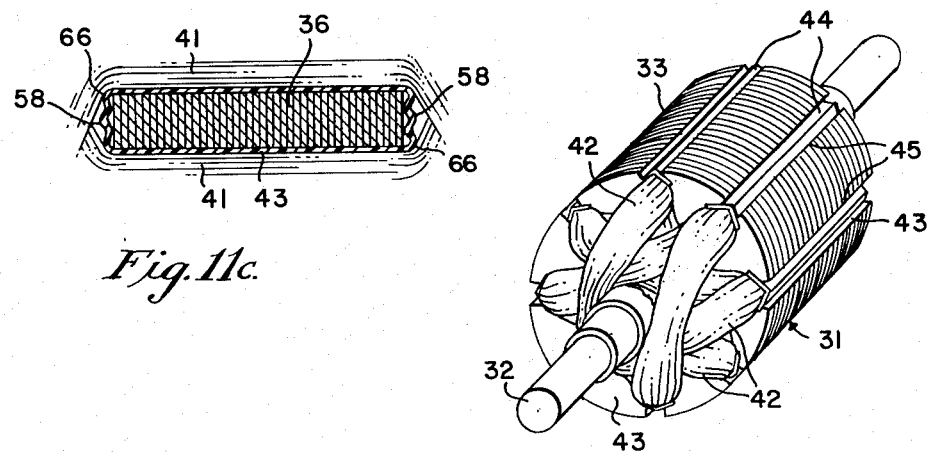
Fig. 11c.
Fig. 11.
INVENTOR.
JOSEPH R. LITTLE
BY
ATTORNEY.

Sept. 22, 1964     J. R. LITTLE     3,150,280
INSULATED STACK OF ELECTRICAL LAMINATIONS
AND METHOD OF MAKING THE SAME
Filed Oct. 13, 1960     11 Sheets-Sheet 8

INVENTOR.
JOSEPH R. LITTLE
BY John F. A. Earley, Jr.
ATTORNEY.

Sept. 22, 1964  J. R. LITTLE  3,150,280
INSULATED STACK OF ELECTRICAL LAMINATIONS
AND METHOD OF MAKING THE SAME
Filed Oct. 13, 1960  11 Sheets-Sheet 9

INVENTOR.
JOSEPH R. LITTLE
BY
ATTORNEY.

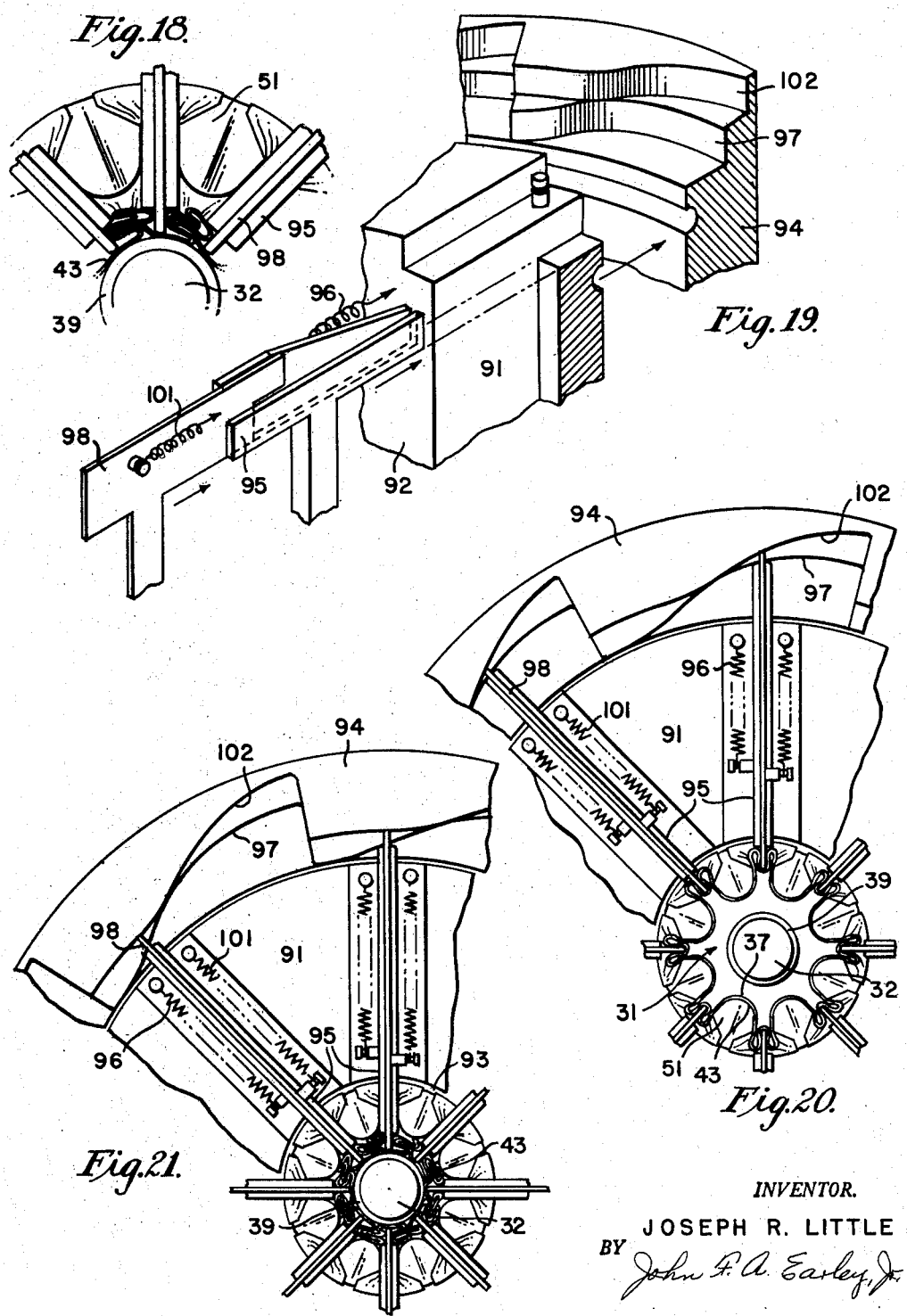

Sept. 22, 1964 J. R. LITTLE 3,150,280
INSULATED STACK OF ELECTRICAL LAMINATIONS
AND METHOD OF MAKING THE SAME
Filed Oct. 13, 1960 11 Sheets-Sheet 11

INVENTOR.
JOSEPH R. LITTLE
BY
ATTORNEY.

United States Patent Office 3,150,280
Patented Sept. 22, 1964

3,150,280
INSULATED STACK OF ELECTRICAL LAMINATIONS AND METHOD OF MAKING THE SAME
Joseph R. Little, Springfield, Pa., assignor, by mesne assignments, to Litton Industries, Inc., Beverly Hills, Calif., a corporation of Delaware
Filed Oct. 13, 1960, Ser. No. 62,496
13 Claims. (Cl. 310—215)

This invention relates to improvements in the lamination stack in electrical devices, and more particularly concerns an insulated lamination stack of a rotor, a stator, or the like, and a method for making them.

Heretofore, it has been ordinary practice to insulate the lamination stack, for example, of rotors of electric motors by gluing an end fiber of insulating material to each end face of the stack, and to insulate the rotor slots with a third piece of insulation which is glued to the surface of the slots and to the two end fibers.

However, rotors insulated in accordance with such practice have a number of disadvantages. For example, the rotor windings often penetrate the joint between the end fibers and the slot insulation and short circuit to the lamination stack. Moreover, while winding the wire on the stack, the wire often catches on the edge of the slot insulation and thereby impedes the operation.

Another disadvantage of conventional methods of insulating a rotor is that the slot insulation must be trimmed, and this trimming operation is a lengthy one which is performed by hand by a skilled worker. Even so, at best only a butt joint is obtained between the end fibers and the slot insulation.

Conventional methods of insulating rotors require that the end lamination have an end fiber affixed thereto, and this entails gluing an end fiber to the face of the end lamination, curing the end lamination and its end fiber under heat and pressure, and cleaning away excess glue. Moreover, an adhesive must also be used to keep the slot insulation in place.

Accordingly, it is an object of this invention to provide an insulated lamination stack and method of making it which overcomes the foregoing problems and disadvantages.

The objects of this invention are accomplished by insulating a lamination stack with one piece of insulating material, thus offering a minimum number of openings where a wire from the winding could get through to the stack and cause a short circuit.

Other objects and advantages of this invention, including its simplicity and economy, will further become apparent hereinafter and in the drawings, in which:

FIG. 1 is a view in perspective of a rotor and illustrates the first step of the method of insulating a lamination stack in accordance with this invention;

FIG. 1a is an end view of the stack of FIG. 1;

FIG. 2 is a view in perspective showing another step of the method, and FIG. 2a is an end view thereof;

FIGS. 5 and 6 are views in perspective showing further steps of the method;

FIG. 7 is a view in perspective showing the stack at a later stage of the method, and FIG. 7a is a view in section taken as indicated by the lines and arrows VII—VII which appear in FIG. 7;

FIG. 8 is a view in perspective showing the stack at a later stage, FIG. 8a shows a perspective view of an element of the invention, and FIG. 8b shows an end view corresponding to the end of FIG. 8 after elements such as shown in FIG. 8a have been inserted in each slot of the stack;

FIG. 9 is a view in perspective showing the stack at a later stage of the method;

FIG. 10 is a view in perspective showing the stack at another step of the method, and FIG. 10a is an end view thereof;

FIG. 11 is a view in perspective showing the stack as it is finally assembled and constructed in accordance with this invention, with FIG. 11a showing a cross-sectional view thereof, FIG. 11b showing an enlarged cross-sectional view of one slot, and FIG. 11c showing a sectional view through one tooth;

FIG. 18 is an enlarged fragmentary view illustrating the final position of the elements of the insulation crimping mechanism as it presses the insulation sheet against the shaft of a rotor which is being insulated;

FIG. 19 is an enlarged fragmentary exploded view in perspective which illustrates the main elements of the apparatus of FIGS. 16, 17;

FIG. 20 is a fragmentary view in top plan showing the initial stage of crimping the insulation sheet against the shaft of a rotor;

FIG. 21 is a view similar to FIG. 20 and illustrates a later stage of the operation;

Figure 3A:
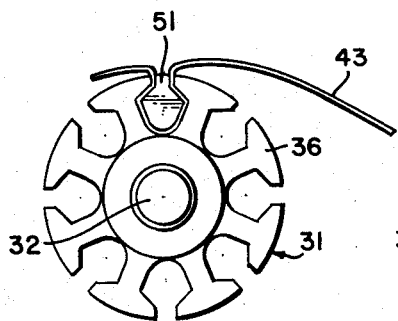
FIGS. 3a–3c are end views showing the stack in progress steps.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a rotor 31 comprising a rotor shaft 32 having a stack 33 of laminations mounted thereon including end laminations 34, 35. The laminations have a series of peripheral teeth 36 with slots 37 formed therebetween. An insulating washer 38 is mounted on shaft 32 at each end of stack 33, and is held in place by insulated collar 39.

Referring to FIGS. 11, 11a, a winding, which includes slot windings 41 and end windings 42 across the face of each end lamination 34, 35, is positioned on rotor 31, and a single sheet of insulation 43 lies in the slots 37 and across the face of each end lamination 34, 35 between the windings 41, 42 and the stack 33. Slot wedges 44 are positioned in the peripheral openings 45 of slots 37 to cover and protect slot windings 41. Insulation sheet 43 has holes formed therein for the top of teeth 36 so that the top surface of each tooth 36 is free of insulation.

In accordance with the method of this invention, insulation sheet 43 (which is preferably made of Mylar plastic or similar type of insulation) is positioned on rotor stack 33 as shown in FIG. 1 and is held in position by placing the thumb of one hand over the slot opening 45 nearest the end of insulation sheet 43. Then (FIG. 2), a taut wire 46, supported in frame 47, is slipped under the thumb and used to force the insulation down in the slot. Wire tool 48 is then removed leaving the insulation in the position illustrated in FIG. 2a.

Figure 3B:
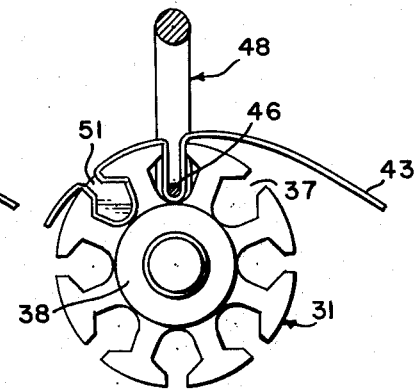

Before the thumb is removed, to hold insulation 43 in place in the slot, a slug 51 (FIG. 3), similar in shape to the laminations slot, is pushed through the slot from one end until it extends an equal length from both end laminations of stack 33. The same procedure is repeated (FIGS. 3a–3b) until all slots have been insulated (FIG. 3c).

Figure 3C:
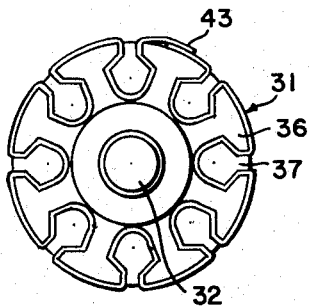
Figure 3:
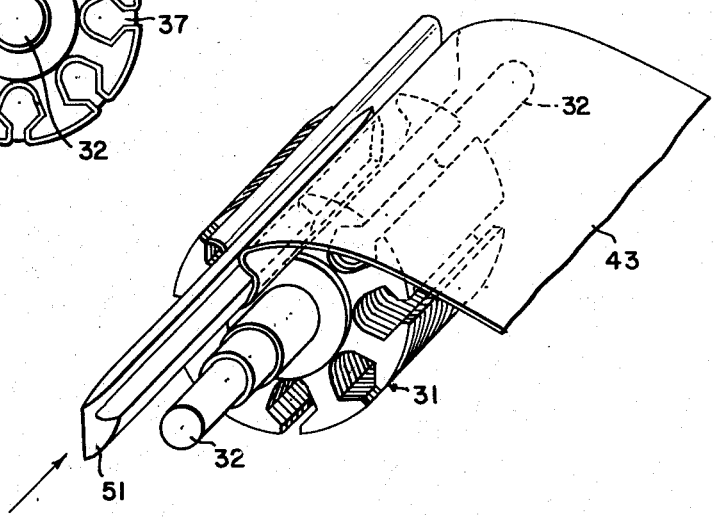
FIG. 3 is a view in perspective showing another step of the method.

The remaining insulation is trimmed to a length such that it extends about three-quarters of the way across the last tooth so that the rotor now appears as is shown in FIG. 3c.

Figure 4B:
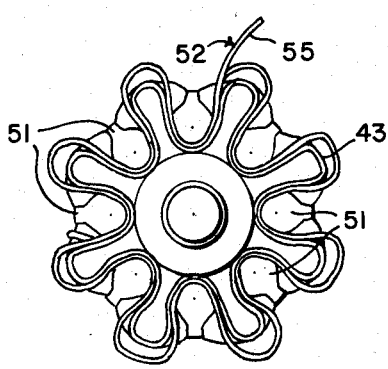
FIGS. 4b–4c show progressive steps.
Figure 4C:
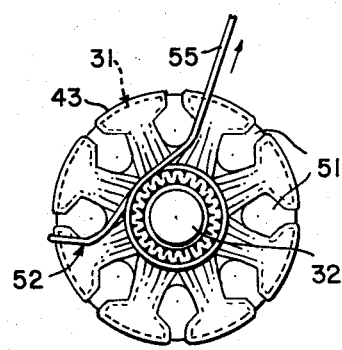
Figure 4A:
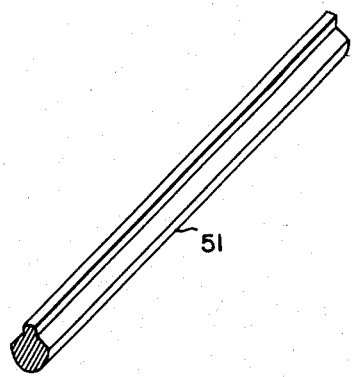
FIG. 4a shows an element which is useful in the practice of the method.
Figure 4:
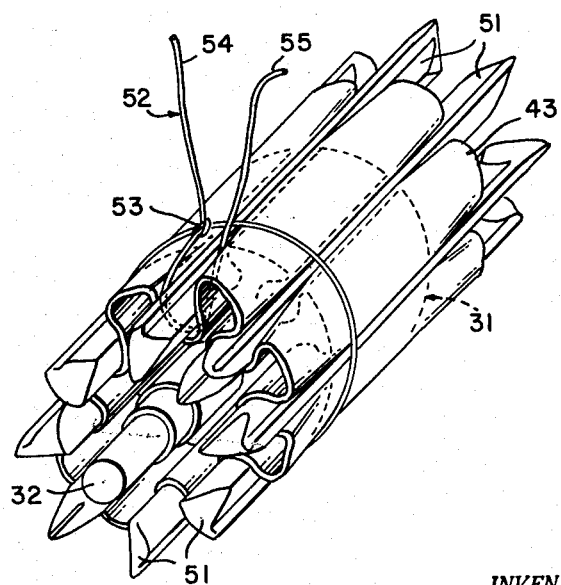
FIG. 4 is a view in perspective illustrating another step of the invention.

The next step is to take a piece of string 52, make a slip knot 53 in one end so as to obtain an anchor end 54 and a running end 55, and place the slip knot 53 around the outside circumference of rotor 31, as illustrated in FIG. 4. The running end 55 of the string 52 is threaded in and out between the slugs 51 and the insulation sheet 43, as shown in FIGS. 4 and 4b.

As each slug 51 is encircled, string 52 is pulled against the face of end lamination 34. After the running end 55 of string 52 has gone all the way around, skipping no slugs 51 and passing preferably at least two slugs beyond the starting point, running end 55 of string 52 is pulled until the insulation sheet closes in against the rotor shaft, as illustrated in FIG. 4c.

Without breaking string 52, the same operations are performed on the opposite end of rotor 31; string 52 is then wound a few turns around the outside circumference of stack 33, the loose running end 55 of string 52 is tucked behind one of slugs 51, and the rotor appears as in FIG. 5.

The rotor is now baked at about 150° C. for approximately one-half hour. After the rotor 31 cools, slugs 51 and string 52 are removed, and the insulation 43 remains in the position it was confined in while the rotor 31 was being baked.

The next step is to trim away excess insulation 43. As shown in FIG. 6, this is accomplished by cutting in toward rotor shaft 32 with a razor-blade-like tool 56 at a groove 57 which is formed when string 52 pulled insulation 43 into contact with rotor shaft 32.

Next, rotor 31 is wound and appears as is shown in FIG. 7. FIG. 7a illustrates the manner in which insulation 43 crinkles at the ends of stack 33 to form end insulation 58 which has a springy characteristic to take up any wire tension changes.

Next, rotor 31 is slot wedged as is shown in FIG. 8, an operation whereby a slot wedge 61 of insulating material is pushed through slots 37 from one end in such a manner as to cover slot windings 41 and to protect them by keeping them below the outside circumference of stack 33.

Next, as is shown in FIG. 9, rotor 31 is chucked in a lathe between specially designed collets 62 which cover the end windings 42. Then shaft 63 of the lathe is rotated and end insulation 58 is cut by a sharp cutting tool 64 in the manner illustrated in FIG. 9. End insulation 58 is preferably cut about .010 inch from the outside circumference of stack 33 as the rotor 31 is turning in a direction away from the operator. In the next step of the method, the portion of insulating sheet 43 which covers the tops of the teeth 36 is to be burned away, and this cutting of end insulation 58 has the effect of offering to the flame an edge of .010 inch to start on.

Next, as illustrated in FIG. 10, a needle point oxygen acetylene flame 65 is passed in a horizontal direction over the rotor 31 which is still turning in a direction away from the operator and away from flame 65. Slot wedges 61, and collets 62 protect slot windings 41 and end windings 42, and centrifugal force throws off the burned away insulation 43 (FIG. 10a).

FIG. 11 shows the rotor 31 after all excess insulation 43 has been burned away, FIG. 11a is a cross-sectional view of the rotor 31 of FIG. 11, and FIG. 11b is a detail view on an enlarged scale of one slot of the rotor shown in FIG. 11a.

FIG. 11c illustrates the insulation 43 in its position around a tooth 36. It is to be noted that there is no break between the slot insulation and the end insulation 58, and further, that there are rounded corners 66 therebetween.

Turning now to FIGS. 12–15, there is shown a machine adapted for inserting an insulated sheet into the slots of a rotor. The machine comprises a base 71 on which is mounted an arm 72, a chuck 73, a slug holder 74, and a rotor-locating pin 75.

Figure 12:
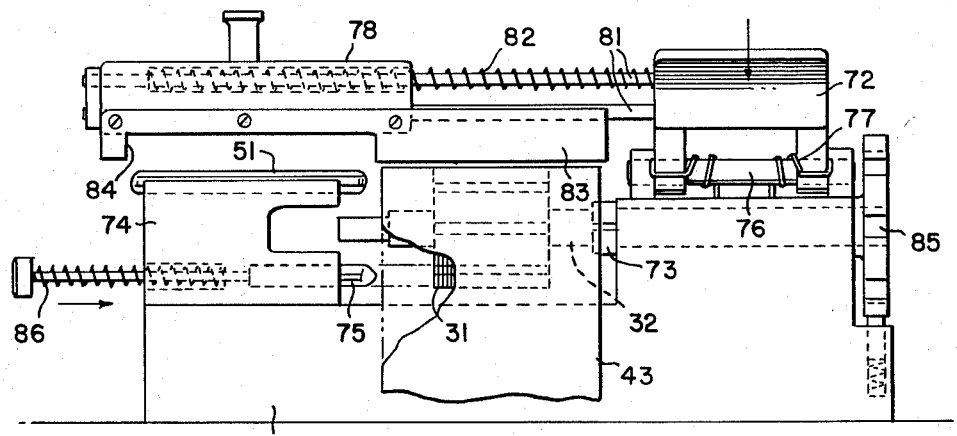
FIG. 12 is a view in front elevation of a machine for carrying out the process of this invention.
Figure 13:
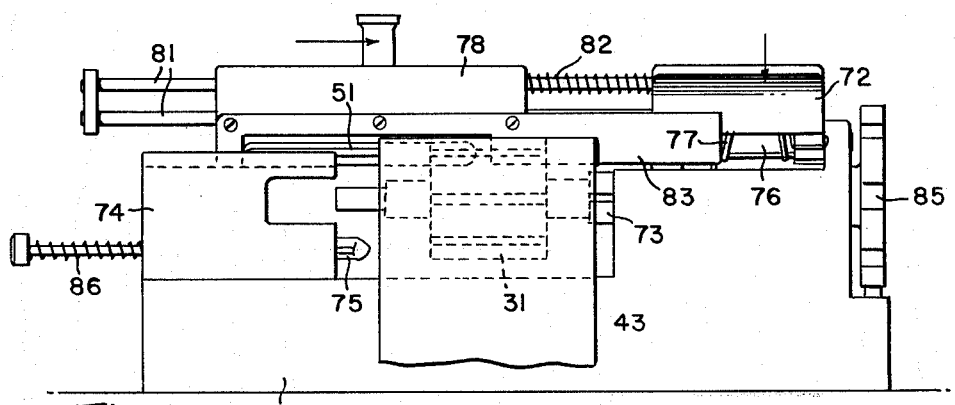
FIG. 13 is a view similar to FIG. 12 showing the machine at a later stage of operation.
Figure 15:
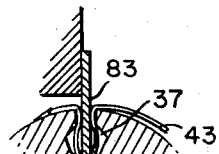
FIG. 15 is an enlarged fragmentary view in cross-section illustrating the insulation sheet being held in the slot element of a rotor by the blade element of the apparatus shown in FIGS. 12–14.

Arm 72 is pivotally connected around a pivot pin 76, is normally held in its upper position by a spring 77, and supports a sliding fixture 78 on rods 81. Sliding fixture 78 is normally held in the position shown in FIG. 12 by a spring 82, and supports a blade 83 which forces the insulation sheet 43 into the slots 37 (FIG. 15). Blade 83 also has a blade extension 84 which is provided with a shoulder that is adapted to contact the end of slug 51 (when it is supported in slug holder 74) to push slug 51 into slot 37 when sliding fixture 78 is moved to the right as illustrated in FIGS. 12 and 13.

Chuck 73 is provided with an indexing head 85 which properly positions the succeeding slots 37 for receiving slugs 51 from slug holder 74.

Locating pin 75 initially positions a slot 37 of rotor 31 so that the remaining slots on the rotor will be in correct position, relative to the slug 51 in slug holder 74 and relative to creasing blade 83, as the rotor 31 is rotated in chuck 73.

In operation of the machine of FIGS. 12–15, one end of rotor shaft 32 is inserted into the jaws of chuck 73. Before the jaws of chuck 73 are tightened completely around shaft 32, locating pin 75 is moved toward rotor 31 against the action of locating-pin spring 86, and rotor 31 is rotated until locating pin 75 slides into one of rotor slots 37. The jaws of chuck 73 are then completely tightened against shaft 32 and locating pin 75 is released from the slot 37 in which it was positioned.

Figure 14:
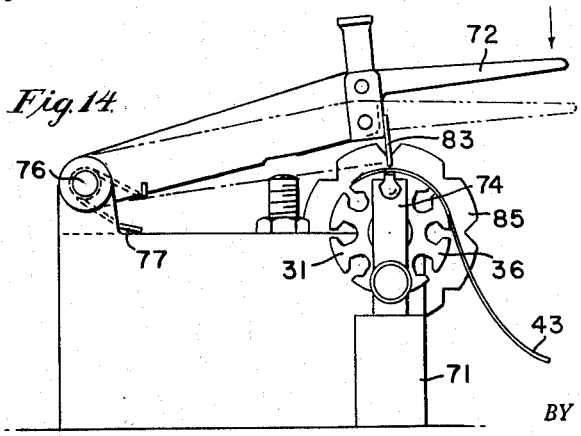
FIG. 14 is a view in side elevation of the machine of FIGS. 12, 13.

Insulating sheet 43 is positioned over the top of tooth 36 as shown in FIG. 14 so that it extends more than half way across the tooth towards the adjacent slot. It is held in place with cement or tape.

Arm 72 is brought down and creasing blade 83 pushes insulation sheet 43 into slot 37 as illustrated in FIG. 15.

Holding arm 72 down, sliding fixture 78 is moved toward the right as shown in FIGS. 12 and 13 so that the shoulder of blade extension 84 engages one end of slug 51 to push it into the slot 37 to press the insulation sheet 43 against the walls of the slot. When slug 51 is fully positioned in slot 37 of rotor 31, arm 72 is raised and slide fixture 78 is released. Spring 82 returns slide fixture 78 to its initial position.

Rotor 31 is indexed to the next slot 37, a new slug 51 is placed in clip of slug holder 74 and the above operation is repeated. When all the slots 37 are filled with insulation sheet 43 and slugs 51, the insulation sheet is cut so that it overlaps the start of the sheet for almost the entire distance between two slots. It is then cemented or taped in place and rotor 31 is removed from the machine ready for the next step of the method of insulating the rotor. The next step may be accomplished by hand as hereinbefore described, or may be accomplished by mechanical apparatus as described hereinafter. Although the machine shown in FIGS. 12–15 is operated by hand, it is apparent that by using suitable cams and timing, the operation may be done automatically.

Figure 16:
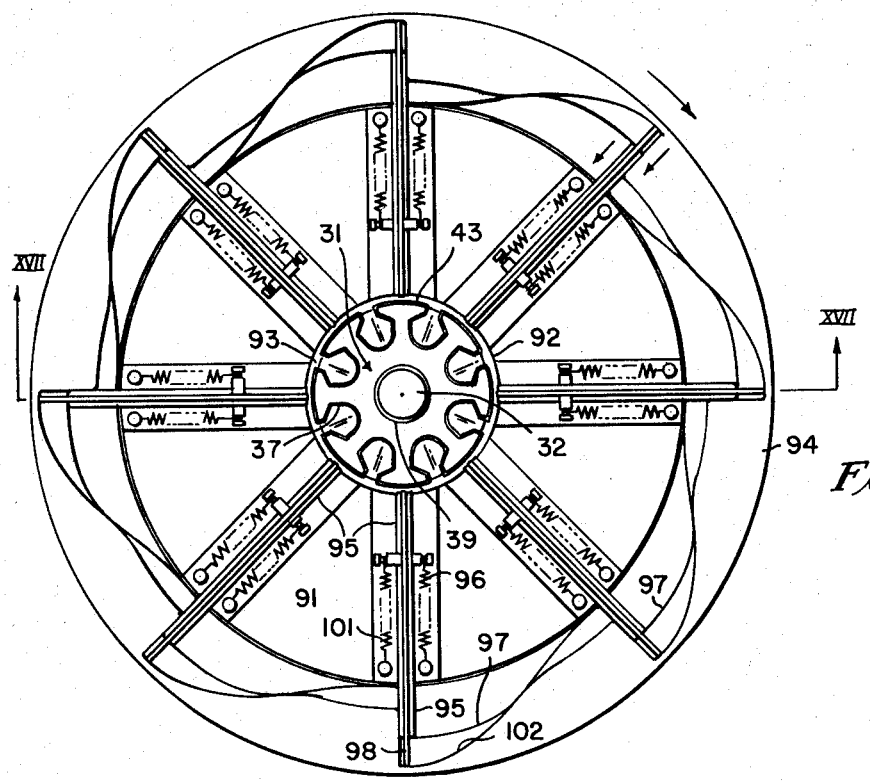
FIG. 16 is a top plan view of insulation crimping mechanism adapted to carry out the process of this invention.
Figure 17:
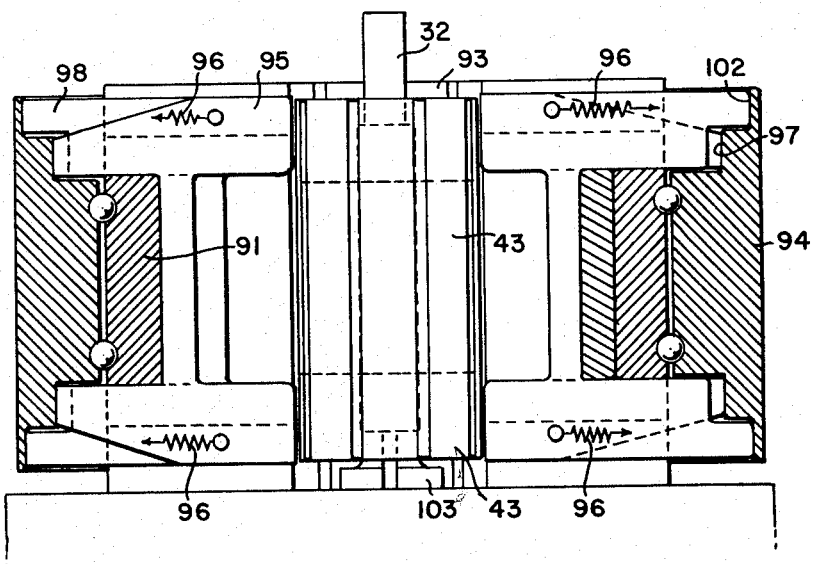
FIG. 17 is a view in section taken as indicated by the lines and arrows XVII—XVII which appear in FIG. 16.

Referring now to FIGS. 16–21, there is shown apparatus for mechanically and automatically crimping the insulation at the ends of rotor 31. FIG. 16 is a top plan view of the apparatus, FIG. 17 is a view in vertical cross-section, and FIG. 19 is an exploded view in perspective. FIGS. 18, 20 and 21 illustrate steps in the operation of the machine.

The insulation crimping appartus of FIGS. 16–21 comprises a stationary base shell 91 which is radially slotted from the walls 92 of a cylindrically-shaped rotor receiving chamber 93. Positioned around the outer circumference of base shell 91 is a rotatable cam shell 94.

A U-shaped cam follower 95 is mounted in the slots of base shell 91 and is pushed in contact with insulation sheet 43 against the action of spring 96 by lower cam 97.

Another cam follower 98 is positioned between the legs of the U-shaped cam follower 95 and is pushed in contact with insulating sheet 43 against the action of spring 101 by upper cam 102.

In operation, rotor 31, which is firmly held in anchor clamp 103, with insulation sheet 43 held in slots 37 by slugs 51, is positioned so that slots 37 are between cam followers 95 and 98. This positioning permits cam followers 95 and 98 to move toward rotor shaft 32 in the space between the slugs 51. As cam shell 94 is rotated, cam follower 98 is forced inwardly towards rotor shaft 32 to make contact with the insulated sheet 43 and start to fold it as illustrated in FIG. 20. Cam follower 98 continues to move toward the shaft 32 until it almost touches the shaft. While cam follower 98 is moving, cam follower 95 starts moving toward shaft 32 but its sequence in doing so is such that it does not touch the insulation sheet 43 until cam follower 98 has reached its innermost position. After that, cam follower 95 moves inwardly to fold, press, and finally crush the insulation sheet against the collar 39 of the shaft 32 as is illustrated in FIGS. 18 and 21.

Rotatable cam shell 94 is left in this closed position to hold the insulation sheet 43 against shaft collar 39, and the entire unit is placed in an oven and there baked until insulation sheet 43 has relaxed from its initial set and has assumed the new set as controlled or forced upon it by the slugs 51 and the cam followers 95 and 98.

After this, rotor 31 is removed from base shell 91 and cam shell 94, slugs 51 are removed from slots 37, and rotor 31 is ready to be further processed as hereinbefore described.

It is to be noted that cam shell 94 operates cam followers 95 and 98 at both ends of the rotor lamination stack to insure uniform operation and to close the insulated sheet 43 at both ends of the stack.

It is also to be noted that the method of insulating a lamination stack with a single sheet of insulating material is not limited to a rotor lamination stack. The method is also applied to other types of lamination stacks, for example, to the stator of an electrical device as illustrated in FIGS. 22–27.

Figure 22:
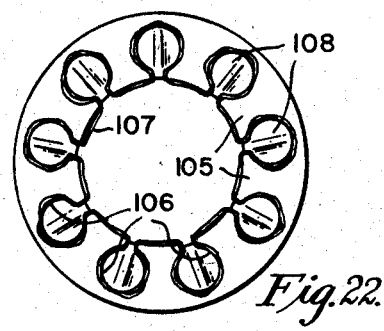
FIG. 22 is an end view of a stack of stator laminations showing the arrangement whereby the insulating sheet is held in the lamination slots by slugs.
Figure 23:
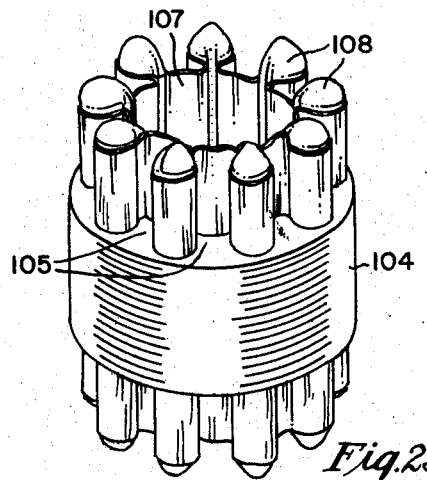
FIG. 23 is a view in perspective of the stator lamination stack of FIG. 22.

End view FIG. 22 and perspective view FIG. 23 show a stator lamination stack 104 having teeth 105 and slots 106, and a single sheet of insulation 107 held in slots 106 by slugs 108. Insulation sheet 107 and slugs 108 may be inserted in the slots 106 either by hand or by machine.

Figure 24:
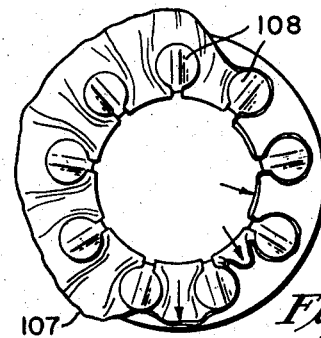
FIG. 24 is an end view of a stator lamination stack illustrating the manner in which the insulating sheet is pulled toward the periphery of the stack.
Figure 25:
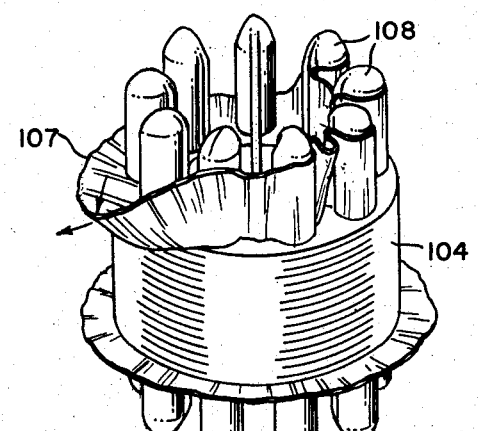
FIG. 25 is a view in perspective of the stator lamination stack of FIG. 24.

To provide insulation for the end faces of stator lamination stack 104, insulation sheet 107 is pulled outwardly between the slugs and then flattened against the end face of the lamination stack. FIGS. 24–25 show the insulation sheet 107 in the process of being flattened against the upper end face of stack 104. Since sheet 107 is relatively thin, it is readily creased, folded, and flattened.

Figure 26:
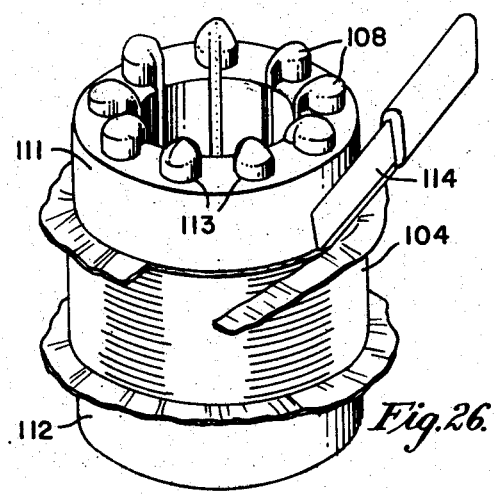
FIG. 26 is a view in perspective of the stator lamination stack and illustrates the manner in which the insulation is held against the end faces of the stack and the manner in which the lamination sheet is trimmed.
Figure 27:
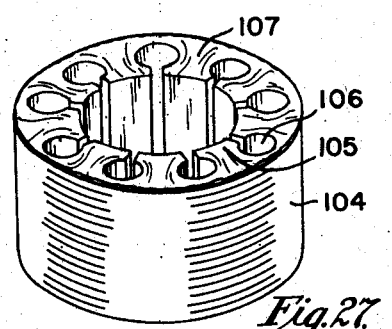
FIG. 27 is a view in perspective showing the stator lamination stack insulated by a single sheet of insulation.

To flatten the ends of insulation sheet 107 which cover the end faces of the lamination stack 104, and to retain the flattened sheet 107 in such position, there are provided two collars 111 and 112 having slots 113 similar to the slots 106 in stator stack 104. Collar slots 113 are inserted over slugs 108 as shown in FIG. 26 and collars 111, 112 are pressed against the ends of stator stack 104 to flatten insulation sheet 107 against the end faces thereof. Collars 111, 112 may be of the same construction as stator stack 104 but of smaller outside diameter.

While the two end collars 111, 112 are kept pressed or clamped against the ends of stator stack 104, the entire assembly is placed in an oven until the insulation sheet 107 is heated enough to accept the new set.

Collars 111, 112 are provided with a smaller outside diameter than the diameter of stator stack 104 to allow trimming knife 114 to cut off the excess of insulation sheet 107 at a slightly smaller diameter than the outside diameter of stator stack 104 (FIG. 26). After end collars 111, 112 and the slugs 108 are removed, stator stack 104 is in condition for final assembly.

The lamination stack constructed in accordance with the present invention is provided with insulation made of one piece of material and this is of advantage in offering greater resistance to short circuits, since the number of openings where a wire could contact the stack has been reduced. Additionally, the insulated stack of the present invention is much more reliable than conventional stacks and consistently withstands much higher voltages.

The padding effect of the gathered end insulation 58 provides a cushion for the rotor windings as they are formed and when they are stressed by temperature changes.

Another advantage of the present invention is that the trimming operation is simplified to such an extent that an unskilled operator is able to trim rotors eight and one-half times faster than skilled operators were able to trim conventional rotors. As hereinbefore stated, conventional rotors required hand trimming.

The rate of production at the rotor winding station has been increased because the edges of insulation 43 at the outside circumference of the stack 33 are rounded (FIG. 7), and have no free edges that the winding wire might catch on to delay and impede production.

Further, no adhesive is required to keep the slot insulation in place. Previously used end fibers are replaced with simple washers 38 which require no positioning (to match the conformation of the end lamination) or gluing.

A further advantage is that the time required to teach an operator the insulation, trim, and wind operations has been considerably reduced.

It is to be understood that the form of the invention herewith shown and described is to be taken as a presently preferred embodiment. Various changes may be made in the shape, size and arrangement of parts. For example, equivalent elements may be substituted for those illustrated and described, parts may be reversed, and certain features of the invention may be utilized independently of the use of other features, all without departing from the spirit or scope of the invention as defined in the subjoined claims.

The claimed invention:

1. An insulated rotor comprising a shaft having a stack of laminations mounted thereon, said laminations having a series of peripheral teeth with slots formed therebetween, a wire winding on said rotor positioned in said slots to form slot windings and positioned across the face of each end lamination to form end windings, and a single sheet of insulation lying between said windings and said stack, said insulation sheet lying in the slots to form slot insulation and across the face of each end lamination to form end insulation, said insulation sheet having rounded corners between said slot and end insulation, said end insulation being crinkled so as to cushion said end windings.

2. An insulated rotor comprising a shaft having a stack of laminations mounted thereon, said laminations having a series of peripheral teeth with slots formed therebetween, a wire winding on said rotor positioned in said slots to form slot windings and across the face of each end lamination to form end windings, a single sheet of insulation lying between said winding and said stack, said insulation sheet lying in the slots to form slot insulation and across the face of each end lamination to form end insulation, said insulation sheet having rounded corners between said slot and end insulation, said end insulation being crinkled so as to cushion said end windings, and an inwardly facing slot wedge positioned in the peripheral opening of each slot and covering the portion of said winding therein.

3. An insulated rotor comprising a shaft having a stack of laminations mounted thereon, said laminations having a series of peripheral teeth with slots formed therebetween, a wire winding on said rotor positioned in said slots to form slot windings and across the face of each end lamination to form end windings, a single sheet of insulation lying between said windings and said stack, said insulation sheet lying in the slots to form slot insulation and across the face of each end lamination to form end insulation, said insulation sheet having rounded corners between said slot and end insulation, said end insulation being crinkled so as to cushion said end windings, and an inwardly facing slot wedge positioned in the peripheral opening of each slot and covering the portion of said winding therein, said insulation sheet having holes formed therein for said teeth so that the top surface of each tooth is free of insulation.

4. An insulated rotor comprising a shaft having a stack of laminations mounted thereon, said laminations having a series of peripheral teeth with slots formed therebetween, an insulating washer mounted on said shaft at each end of said stack, a wire winding on said rotor positioned in said slots to form slot windings and across the face of each end lamination to form end windings, a single sheet of insulation lying between said windings and said stack, said insulation sheet lying in the slots to form slot insulation and across the face of each end lamination to form end insulation, said insulation sheet having rounded corners between said slot and end insulation, said end insulation being crinkled so as to cushion said end windings, and an inwardly facing slot wedge positioned in the peripheral opening of each slot and covering the portion of said winding therein, said insulation sheet having holes formed therein for said teeth so that the top surface of each tooth is free of insulation.

5. A method of insulating a rotor comprising taking a rotor shaft with a stack of laminations mounted thereon, said laminations having a series of peripheral teeth with slots formed therebetween, holding the start end of a sheet of insulation on the periphery of said stack, forcing said sheet down into each of said slots, placing a slug into each slot so that it holds said sheet in place to form slot covering portions and tooth covering portions and extends outwardly from the ends of the slots and from the sides of said sheet, placing around the periphery of said sheet a loop of string having a slip-knot therein with an anchored end and a running end, threading the running end of said string serially beneath each slug and over said sheet at one end of said stack, pulling said running end of the string to bring said loop close around said rotor shaft to form a stack-end covering portion of said sheet, baking the rotor assembly to set the insulation in position, and trimming the excess insulation at the ends of said stack.

6. A method of insulating a rotor comprising taking a rotor shaft with a stack of laminations mounted thereon, said laminations having a series of peripheral teeth with slots formed therebetween, holding the start end of a sheet of insulation on the periphery of said stack, forcing said sheet down into each of said slots, placing a slug into each slot so that it holds said sheet in place to form slot covering portions and tooth covering portions and extends outwardly from the ends of the slots and from the sides of said sheet, placing around the periphery of said sheet a loop of string having a slip-knot therein with an anchor end and a running end, threading the running end of said string serially beneath each slug and over said sheet at one end of said stack, pulling said running end of the string to bring said loop close around said rotor shaft to form a stack-end covering portion of said sheet, baking the rotor assembly to set the insulation in position, and trimming the excess insulation at the ends of said stack.

7. A method of insulating a rotor comprising taking a rotor shaft with a stack of laminations mounted thereon, said laminations having a series of peripheral teeth with slots formed therebetween, placing an insulating washer on said shaft at each end of said stack, holding the start end of a sheet of insulation on the periphery of said stack, forcing said sheet down into each of said slots, placing a slug into each slot so that it holds said sheet in place to form slot covering portions and tooth covering portions and extends outwardly from the ends of the slots and from the sides of said sheet, overlapping the start end of said sheet with the finish end thereof, placing around the periphery of said sheet a loop of string having a slip-knot therein with an anchor end and a running end, threading the running end of said string serially beneath each slug and over said sheet at one end of said stack, pulling said running end of the string to bring said loop close around said rotor shaft to form a stack-end covering portion of said sheet, again placing around the periphery of said sheet a second loop of the string having a slip-knot therein with an anchor end and a running end, threading the running end of said second loop serially beneath each slug and over said sheet at the other end of said stack, pulling said running end of said second loop to bring said second loop close around said rotor shaft to form another stack-end covering portion of said sheet, anchoring said running end of the string by tucking it behind one of said slugs, baking the rotor assembly at about 150° C. for approximately one-half hour, allowing said rotor assembly to cool, removing said slugs, removing said string, trimming the excess insulation at the ends of said stack by cutting toward said rotor shaft at the groove formed in said sheet when the string pulled it close around said shaft, winding wires on said rotor in said slots, protecting the slot winding by applying a slot wedge to the peripheral opening of each slot to cover the wires therein, protecting the end winding which crosses the face of each end lamination by chucking the end laminations between protecting collets that cover the end windings, rotating the rotor assembly and cutting the stack-end covering portions of said sheet near the periphery thereof, and removing the tooth covering portions of said sheet by applying a flame thereto while said rotor assembly is rotating to thereby burn them away.

8. A method of trimming the unwanted insulation from the peripheral surface of the teeth of a rotor having a winding in its slots and across the face of each of its end laminations, comprising protecting the slot winding by applying a slot wedge to the peripheral opening of each slot to cover the wires therein, protecting the end winding which crosses the face of each end lamination by chucking the end laminations between protecting collets that cover the end winding, rotating the rotor assembly and cutting the stack-end covering portions of said sheet near the periphery thereof, and removing the tooth covering portions of said sheet by applying a flame thereto while said rotor assembly is rotating to thereby burn them away.

9. An electrical lamination stack, said stack covered with insulation, and said stack having a series of teeth with slots formed therebetween, a wire winding positioned in said slots and across the end faces of said stack, and said insulation developed from a single sheet of insulation to lie in said slots, cover said teeth and lie across the end faces of said lamination stack and between said winding and said stack, said insulation being crinkled against the end faces of the stack so as to cushion the wire winding.

10. An insulated electrical lamination stack comprising a stack of electrical laminations having a series of teeth with slots formed therebetween, a wire winding positioned in said slots and across the end faces of said stack, and a single sheet of insulation positioned in said slots between the winding and the stack and positioned across the end faces of said stack between the winding and the stack, said insulation being crinkled against the end faces of the stack so as to cushion the wire winding.

11. An insulated stator comprising a stack of electrical stator laminations having a series of teeth with slots formed therebetween, a wire winding positioned in said slots and across the end faces of said stack, and a single sheet of insulation positioned between the winding and said stack and covering the teeth, slots, and end faces of said stack, said insulation being crinkled against the end faces of the stack so as to cushion the wire winding.

12. A method of insulating a stack of electrical laminations having a series of teeth with slots therebetween, comprising taking a single sheet of insulation material, forcing said sheet into each of said slots, inserting a slug into each slot to hold said sheet in place therein, crinkling said sheet across the end faces of said stack, and baking said stack and sheet to set said sheet in position.

13. An insulated lamination stack comprising a stack of electrical laminations having a series of teeth with slots formed therebetween, and a sheet of insulation positioned in such slots to form slot insulation and positioned contiguous to each end of said stack to form end insulation, said end insulation being crinkled so as to provide a cushion.

References Cited in the file of this patent

UNITED STATES PATENTS

| | | |
|---|---|---|
| 1,974,406 | Apple | Sept. 25, 1934 |
| 2,383,019 | Sigmund et al. | Aug. 21, 1945 |
| 2,483,024 | Roters | Sept. 27, 1949 |
| 2,745,030 | Baldwin | May 8, 1956 |
| 2,763,916 | Korski | Sept. 25, 1956 |
| 2,769,934 | Stone et al. | Nov. 6, 1956 |
| 2,810,086 | Hibbitt et al. | Oct. 15, 1957 |
| 2,837,669 | Fisher et al. | June 3, 1958 |